United States Patent
Wang et al.

(10) Patent No.: US 9,532,371 B2
(45) Date of Patent: Dec. 27, 2016

(54) METHOD AND APPARATUS FOR SCHEDULING USER EQUIPMENT

(75) Inventors: Gang Wang, Beijing (CN); Lei Jiang, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 10 days.

(21) Appl. No.: 14/345,139

(22) PCT Filed: Mar. 23, 2012

(86) PCT No.: PCT/CN2012/072935
§ 371 (c)(1),
(2), (4) Date: Sep. 8, 2014

(87) PCT Pub. No.: WO2013/139036
PCT Pub. Date: Sep. 26, 2013

(65) Prior Publication Data
US 2015/0003268 A1 Jan. 1, 2015

(51) Int. Cl.
*H04W 72/12* (2009.01)
*H04W 72/08* (2009.01)
(Continued)

(52) U.S. Cl.
CPC ........ *H04W 72/1231* (2013.01); *H04L 1/0003* (2013.01); *H04L 1/0015* (2013.01);
(Continued)

(58) Field of Classification Search
CPC ........... H04W 72/1231; H04W 52/367; H04W 72/08; H04L 1/0003; H04L 1/0015; H04L 5/0057
(Continued)

(56) References Cited

U.S. PATENT DOCUMENTS

| | | | |
|---|---|---|---|
| 2003/0081572 A1* | 5/2003 | Kim | H04W 52/16 370/332 |
| 2011/0250919 A1* | 10/2011 | Barbieri et al. | 455/509 |

(Continued)

FOREIGN PATENT DOCUMENTS

| | | |
|---|---|---|
| CN | 102088762 A | 6/2011 |
| CN | 102271354 A | 12/2011 |

(Continued)

OTHER PUBLICATIONS

Communication dated May 26, 2015 from the Japanese Patent Office in Counterpart Application No. 2014546277.
(Continued)

*Primary Examiner* — Obaidul Huq
(74) *Attorney, Agent, or Firm* — Sughrue Mion, PLLC

(57) ABSTRACT

Embodiments of the disclosure provide a method and apparatus for scheduling a UE, wherein a BS serves the UE and employs a non-normal subframe to coordinate inter-cell interference, and wherein transmission power in the non-normal subframe is lower than that in a normal subframe. In the method according to embodiments of the present invention, channel quality information for the non-normal subframe may be adjusted based on information on transmission power of downlink packets and reference signals; and a target MCS may be determined according to the adjusted channel quality information, so that the BS schedules the UE based on the target MCS in the non-normal subframe.

19 Claims, 5 Drawing Sheets

(51) Int. Cl.
*H04W 52/36* (2009.01)
*H04L 1/00* (2006.01)
*H04L 5/00* (2006.01)

(52) U.S. Cl.
CPC ......... *H04W 52/367* (2013.01); *H04W 72/08* (2013.01); *H04L 5/0057* (2013.01)

(58) Field of Classification Search
USPC ....... 370/241, 252, 310, 328, 329, 351, 389, 370/395.1, 395.4, 431, 437, 464, 465; 455/403, 455/422.1, 450, 452.1
See application file for complete search history.

(56) References Cited

U.S. PATENT DOCUMENTS

2012/0113920 A1* 5/2012 Cheng et al. ................. 370/329
2013/0114434 A1* 5/2013 Muruganathan et al. .... 370/252
2013/0315092 A1* 11/2013 Yu et al. ....................... 370/252

FOREIGN PATENT DOCUMENTS

| CN | 102281518 A | 12/2011 |
|---|---|---|
| EP | 2385643 A1 | 11/2011 |
| WO | 2010131354 A1 | 11/2010 |

OTHER PUBLICATIONS

Huawei, "Analysis of Power Reduction for Lower Power ABS"; 3GPP TSG-RAN WG4 Meeting #62Bis, 3GPP, Mar. 26, 2012-Mar. 30, 2012, R4-121668.

Hitachi Ltd,"Specification Impact of Non-Zero Power ABS"; 3GPP TSG RAN WG1 #68bis, 3GPP, Mar. 26, 2012-Mar. 30, 2012, R1-121301.

International Search Report of PCT/CN2012/072935, dated Dec. 27, 2012.

Communication dated Oct. 10, 2016 from the State Intellectual Property Office of the P.R.C. in counterpart Application No. 201280045005.5.

* cited by examiner

METHOD AND APPARATUS FOR SCHEDULING USER EQUIPMENT

CROSS REFERENCE TO RELATED APPLICATIONS

This application is a National Stage of International Application No. PCT/CN2012/072935 filed Mar. 23, 2012, the contents of all of which are incorporated herein by reference in their entirety.

FIELD OF THE INVENTION

Embodiments of the present invention generally relate to communication techniques. More particularly, embodiments of the present invention relate to a method and apparatus for scheduling user equipment.

BACKGROUND OF THE INVENTION

3GPP LTE and LTE-Advanced are one of the next generation cellular communication standards, which create a new series of specifications for the new evolving radio-access technology. In LTE-Advanced, heterogeneous network (HetNet) is deployed by including Macro eNB/eNodeB and low power nodes (LPN) such as pico eNB, femto eNB, relay node and RRH. The low power nodes increase the spectrum efficiency and improve the system coverage and cell throughput performance, but introduce interference cases which do not exist in a homogeneous network.

One of the interfering cases is, for example, the interference from a Macro eNB to a user equipment (UE) served by a low power node, especially when Cell Range Extension (CRE) is applied. To eliminate such kind of interference, an Enhanced Inter-Cell Interference Coordination (eICIC) scheme is proposed. Specifically, the eICIC scheme introduces two kinds of subframes, one is normal subframe and the other is non-normal subframe, e.g., an almost blank subframe (ABS), non-zero power ABS, and so on. In the eICIC scheme proposed in LTE Release 10, the Macro eNB will stop transmission in the ABS, so interference from the Macro eNB to the UE will be substantially reduced during the ABS. In Further eICIC (FeICIC) scheme proposed in LTE Release 11, the non-zero power ABS is introduced to further improve the performance. In particular, the Macro eNB will not stop transmission in the non-zero power ABS, but the downlink transmission power is decreased so as to reduce the interference from the Macro eNB to the UE. Therefore, the interference levels for the UE in normal subframes and in non-normal subframes are different.

Another one of the interfering cases is the interference from a LPN (e.g., pico eNB) to a UE served by a Macro eNB. In an exemplary eICIC scenario, the LPN stops transmission in the ABS, and the UE experience no interference from the LPN during the ABS. In another exemplary eICIC scenario, the LPN decreases transmission power in the non-zero power ABS, and the UE experience small interference from the LPN during the non-zero power ABS. Therefore, the interference levels for the UE in normal subframes and in non-normal subframes are also different.

Yet another one of the interfering cases is the interference from a Macro eNB to a UE served by another Macro eNB. Similarly, under the eICIC scheme, the interference levels for the UE in normal subframes and in non-normal subframes are also different.

Modulation and coding schemes (MCS) describes a number of variables need to be agreed upon between the transmitter and receiver, including coding method, modulation type, number of spatial streams, and other physical attributes. The MCS value or index is used to establish the communication variables a transmitter and receiver will use. The MCS index can be used to determine the corresponding physical data rate.

In order to improve transmission efficiency, mobile communication solutions use various advanced techniques so that the transmitter to adjust the data rate according to the channel quality or condition. Such solutions receive Channel Quality Information (CQI) fed back from the receivers and perform data transmission at an optimal timing with an optimal MCS. Specifically, these solutions may decrease the data rate for bad channel conditions so as to maintain a reception error rate at an intended level and increase the data rate for good channel conditions to maximize the throughput, thereby improving system throughput. In this regard, the transmission efficiency may be improved with the enough information on the transmission channel.

However, due to the different interference levels for the normal subframes and the non-normal subframes in the eICIC scheme, the MCS applied to the normal subframes may not be suitable for the non-normal subframes; accordingly, the performance of the system will be reduced.

In view of the foregoing problem, there is a need to find a suitable MCS for the non-normal subframes, so as to effectively improve the scheduling of the UE and the performance of the system.

SUMMARY OF THE INVENTION

The present invention proposes a solution which finds a suitable MCS for non-normal subframes. Specifically, the present invention provides a method and apparatus for scheduling the UE by using an adjusted MCS which is more suitable for the non-normal subframes.

According to a first aspect of the present invention, embodiments of the invention provide a method for scheduling a UE, wherein a BS serves the UE and employs a non-normal subframe to coordinate inter-cell interference, and wherein transmission power in the non-normal subframe is lower than that in a normal subframe. The method may comprise steps of: adjusting channel quality information for the non-normal subframe based on information on transmission power of downlink packets and reference signals; and determining a target MCS according to the adjusted channel quality information, so that the BS schedules the UE based on the target MCS in the non-normal subframe.

According to a second aspect of the present invention, embodiments of the invention provide an n apparatus for scheduling a UE, wherein a BS serves the UE and employs a non-normal subframe to coordinate inter-cell interference, and wherein transmission power in the non-normal subframe is lower than that in a normal subframe. The apparatus may comprise: adjusting unit configured to adjust channel quality information for the non-normal subframe based on information on transmission power of downlink packets and reference signals; and determining unit configured to determine a target MCS according to the adjusted channel quality information, so that the BS schedules the UE based on the target MCS in the non-normal subframe.

The following benefits are expected with the invention. With the solution according to the present invention, the MCS and/or CQI in non-normal subframes may be more accurate and within the eNB resource element (RE) dynamic range. Accordingly, the performance gain of eICIC scheme is obtained.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

DETAILED DESCRIPTION OF EMBODIMENTS

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

In the disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included.

In the disclosure, a base station (BS) may refer to a node B (NodeB or NB) or an evolved NodeB (eNodeB or eNB). A base station may be a macrocell BS or a small cell BS. According to the present invention, a macrocell BS may be a base station which manages a macrocell, for example, a macro eNB, and a small cell BS may be a base station which manages a small cell, for example, a pico eNB, a femto eNB, and some other suitable low power nodes.

It is to be noted that, in this disclosure, the non-normal subframe used in an eICIC scheme generally has a non-zero transmission power lower than that in a normal subframe. For example, the eICIC scheme according to the present invention may be FeICIC scheme proposed in LTE Release 11, wherein the non-zero power ABS is introduced as an exemplary non-normal subframe. As can be appreciated by those skilled in the art, the FeICIC scheme proposed in LTE Release 11 is an example, not a limitation, for the eICIC scheme described in the disclosure, and the solutions proposed by the present invention may be applicable for any other suitable inter-cell interference coordination scheme in which a BS transmits packets to a UE in a non-normal subframe, meanwhile the transmission power in the non-normal subframe is lower than that in a normal subframe.

Figure 1:
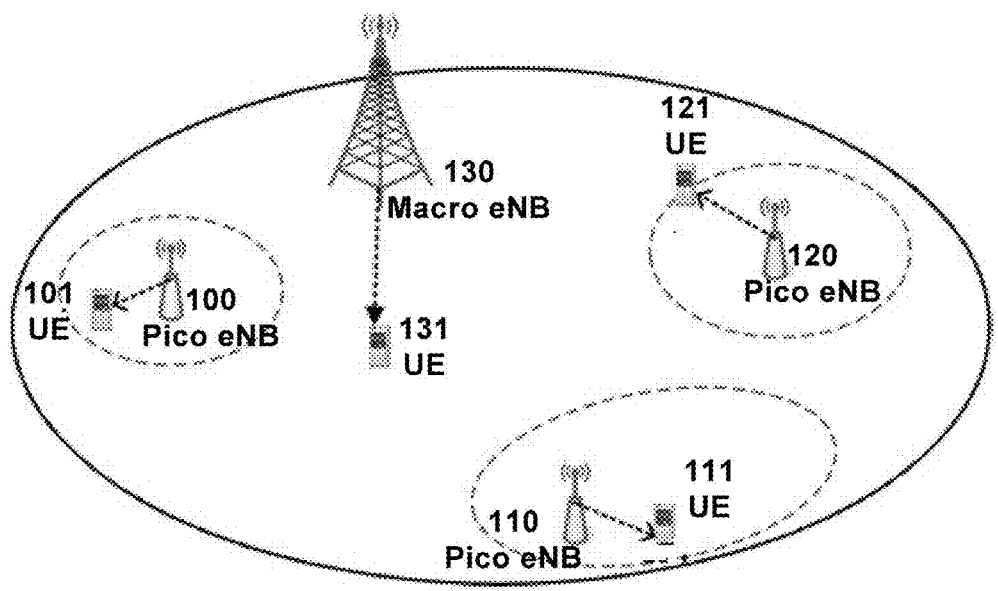
FIG. 1 illustrates a schematic diagram of a HetNet system.

Reference is first made to FIG. 1, which illustrates a schematic diagram of a HetNet system applicable to embodiments of the present invention.

The communication environment of FIG. 1 illustrates a LTE system. The system illustratively comprises three Pico eNBs 100, 110 and 120 and one Macro eNB 130, wherein the Pico eNB 100 serves UE 101, the Pico eNB 110 serves UE 111, the Pico eNB 120 serves UE 121, and the Macro eNB 130 serves UE 131

According to embodiments of the present invention, the UE 101 may be interfered by neighboring BSs, for example, the Macro eNB 130 or Pico eNB 110 or 120 which do not serve the UE 101. Generally, the Macro eNB usually has more interference to the UE 101 than the Pico eNB 110 or 120. Accordingly, the Macro eNB 130 may transmit packets to the UE 131 in either normal subframes or non-normal subframes so as to reduce the interference to the UE 101 in the non-normal subframes.

According to further embodiments of the present invention, the UE 131 may be interfered by another Macro eNB (not shown) which does not serve the UE 131. The another Macro eNB may transmit packets to its UE (not the UE 131) in either normal subframes or non-normal subframes so as to reduce the interference to the UE 131 in the non-normal subframes.

For better understanding, the following embodiments of the present disclosure are described under the LTE system, for example, in the communication environment of FIG. 1. As can be appreciated by those skilled in the art, the present disclosure can be applicable to any other suitable communication environment, but not limited to the specific arrangement shown in FIG. 1.

Figure 2:
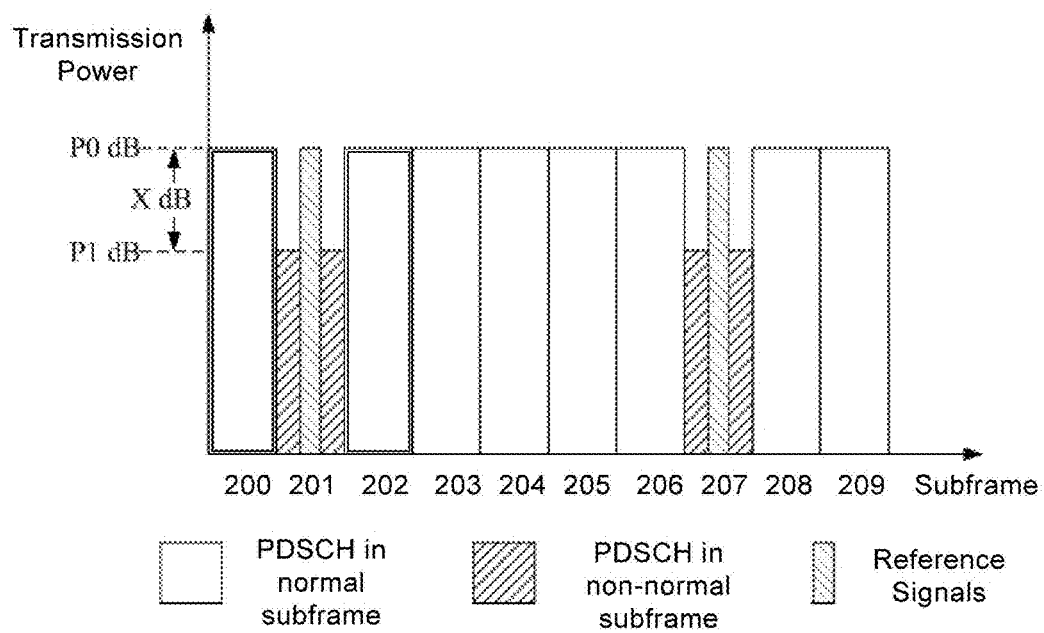
FIG. 2 illustrates a schematic diagram of transmission power in normal subframes and in non-normal subframes.

Reference is now made to FIG. 2, which illustrates a schematic diagram of transmission power in normal subframes and in non-normal subframes.

According to embodiments of the present invention, a subframe may have different types, such as normal and non-normal. In the normal subframes, the BS transmits packets to the UE with normal transmission power, while in the non-normal subframes, the BS may transmits packets to the UE with lower transmission power. That is, transmission power in the non-normal subframe is lower than that in a normal subframe. FIG. 2 illustratively shows 10 subframes, including eight normal subframes 200, 202, 203, 204, 205, 206, 208 and 209, and two non-normal subframes 201 and 207. It is seen from FIG. 2 that the Physical Downlink Shared Channel (PDSCH) transmission power in normal subframes is P0 dB, the PDSCH transmission power in non-normal subframes 201 or 207 is P1 dB, and P1 is X dB lower than P0. As can be seen from FIG. 2, the power for reference signals from the BS to the UE is the same whatever they are sent in the normal subframes or the non-normal subframes.

As mentioned above, two kinds of subframes, normal subframes and non-normal subframes are involved in the eICIC scheme. The non-normal subframe may be the non-zero power ABS as defined in LTE Release 11. During the non-normal subframe, the transmission power in the non-normal subframe is lower than that in a normal subframe. As such, the interference in the non-normal subframe may be reduced.

Regarding the schedule of UE in the non-normal subframes, such as non-normal subframe 201 and 207, the present invention provides solutions, such as shown in FIGS. 3-6, to determine a target MCS according to channel quality information for the non-normal subframe, so that the BS may schedule the UE based on the target MCS in the non-normal subframe.

Figure 3:
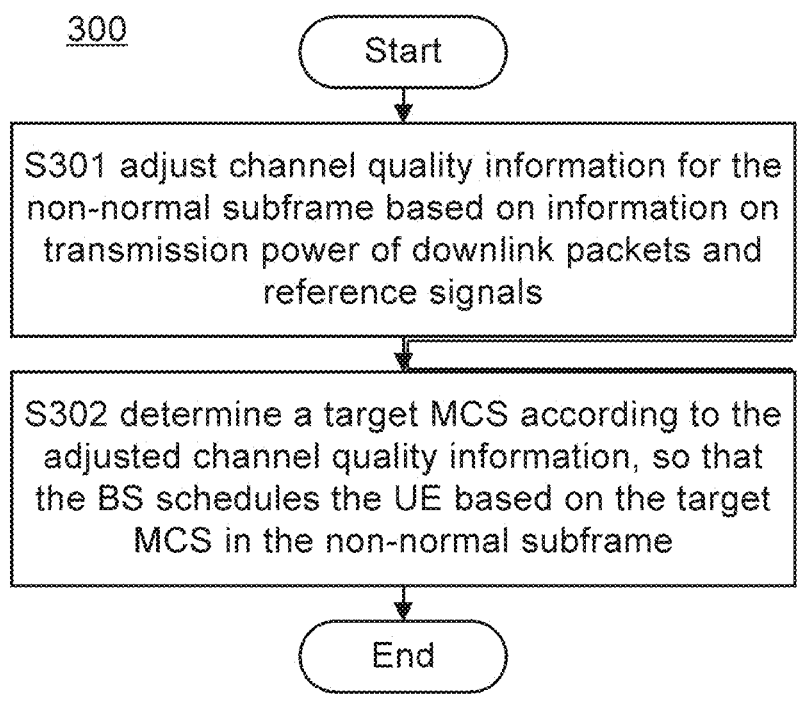
FIG. 3 illustrates a flow chart of a method for scheduling a UE according to embodiments of the invention.

Reference is now made to FIG. 3, which illustrates a flow chart of a method 300 for scheduling a UE according to embodiments of the invention. In these embodiments, a BS may serve the UE and may employ a non-normal subframe to coordinate inter-cell interference, wherein the transmission power in the non-normal subframe is lower than that in a normal subframe. The method as illustrated in FIG. 3 may be performed at the BS, the UE, or some other suitable devices.

At step S301, channel quality information for the non-normal subframe is adjusted based on information on transmission power of downlink packets and reference signals.

According to embodiments of the present invention, channel quality information may comprise information which reflects the quality of the channel from the BS to the UE. For example, the channel quality information may comprise signal to interference plus noise ratio (SINR), Signal to Noise Ratio (SNR), Signal to Interference Ratio (SIR), Carrier to Interference plus Noise Ratio (CINR), Carrier to Noise Ratio (CNR), and so on. In the embodiments, the channel quality information is exemplarily comprises SINR. It is to be noted that, in other embodiments of the present invention, the channel quality information may further comprise SNR, SIR, CINR, CNR or any combination of SINR, SNR, SIR, CINR, and CNR.

According to embodiments of the present invention, the transmission from the BS to the UE may be considered as the downlink transmission and the transmission from the UE to the BS may be considered as the uplink transmission. For the downlink transmission, the BS may play a role of a transmitter which transmits packets to the receiver and the UE may play a role of a receiver which receives packets from the transmitter. The downlink transmission may be performed on Physical Downlink Shared Channel (PDSCH).

In the following description, "Reference Signal (RS)" denotes the signal predefined between the transmitter and the receiver for two purposes. The first purpose of the RS is to allow the receiver to measure the CSI. The second purpose of the RS is to allow the receiver to demodulate the signal transmitted by the transmitter. There is the RS that is defined, in the downlink of the LTE system, to be commonly used by all of the receivers within a cell. This type of RS is referred to as Common RS (CRS) or cell-specific RS because it is defined per cell.

According to embodiments of the present invention, the transmission power of RS may be predetermined at the BS by operators, service providers, or someone else. The transmission power of downlink packets may be determined at the BS based on the power limit of downlink transmission.

According to embodiments of the present invention, channel quality information for the non-normal subframe may be a SINR for transmission from the BS to the UE, that is, a SINR for downlink transmission. The SINR for transmission from the BS to the UE may be obtained and may be adjusted based on the information on transmission power of downlink packets and reference signals.

According to embodiments of the present invention, channel quality information for the non-normal subframe may be a SINR for transmission from the BS to the UE, that is, a SINR for downlink transmission. The SINR for transmission from the BS to the UE may be obtained and may be adjusted based on the information on transmission power of downlink packets and reference signals.

According to embodiments of the present invention, the method according to the present invention may be performed at the BS. In this case, the SINR may be obtained by: receiving a Channel Quality Indicator (CQI) measured by the UE and obtaining the SINR corresponding to the received CQI.

According to embodiments of the present invention, the method according to the present invention may be performed at the UE. In this case, the SINR may be obtained by: receiving reference signals from the BS and measuring the SINR based on the received reference signals.

At step S302, a target modulation and coding scheme (MCS) is determined according to the adjusted channel quality information, so that the BS schedules the UE based on the target MCS in the non-normal subframe.

According to embodiments of the present invention, a candidate MCS may be selected from a CQI-MCS mapping table based on the adjusted channel quality information; and the target MCS may be determined based on the candidate MCS and a power control dynamic range.

According to embodiments of the present invention, the target MCS may be determined based on the candidate MCS and a power control range as follows. First, the power control range and the information on transmission power of downlink packets and reference signals are compared. In response to that the information on transmission power of downlink packets and reference signals exceeds the power control range, a MCS with least requirements in the CQI-MCS mapping table may be determined as the target MCS; and in response to that the information on transmission power of downlink packets and reference signals does not exceed the power control range, the target MCS may be determined as below: if the information on transmission power of downlink packets and reference signals does not exceed the dynamic level for a modulation mode of the candidate MCS, determining the candidate MCS as the target MCS, and if the information on transmission power of downlink packets and reference signals exceeds the dynamic level for a modulation mode of the candidate MCS, determining a MCS with less requirements than the candidate MCS in the CQI-MCS mapping table as the target MCS, wherein the target MCS has different modulation mode from the candidate MCS.

According to embodiments of the present invention, the method according to the present invention may be performed at the BS. In this case, the method may further comprise steps of scheduling the UE by using the target MCS; and sending packets to the UE based on the scheduling result.

According to embodiments of the present invention, the method according to the present invention may be performed at the BS. In this case, the method may further comprise a step of transmitting, to the UE, the information on transmission power of downlink packets and reference signals, so that the UE decodes packets transmitted from the BS based on the information on transmission power of downlink packets and reference signals.

According to embodiments of the present invention, the method according to the present invention may be performed at the UE. In this case, the method may further comprise steps of: obtaining a target CQI based on the target MCS; and reporting the target CQI to the BS, so that the BS obtains the target MCS based on the target CQI, schedules the UE by using the target MCS, and sends packets to the UE based on the scheduling result.

According to embodiments of the present invention, the method according to the present invention may be performed at the UE. In this case, the method may further comprise a step of: receiving from the BS the information on transmission power of downlink packets and reference signals.

According to embodiments of the present invention, the information on transmission power of downlink packets and reference signals may comprise a ratio of Physical Downlink Shared Channel (PDSCH) energy per resource element (EPRE) to reference signal (RS) EPRE, which is called ratio of PDSCH EPRE to RS EPRE hereafter for brief. According to embodiments of the present invention, the information on transmission power of downlink packets and reference signals may further comprise other information which may represent variation of the transmission power in a non-normal subframe. Those skilled in the art will understand that the ratio of PDSCH EPRE to RS EPRE is only an example for the information on transmission power of downlink packets and reference signals, rather than limitation.

Figure 4:
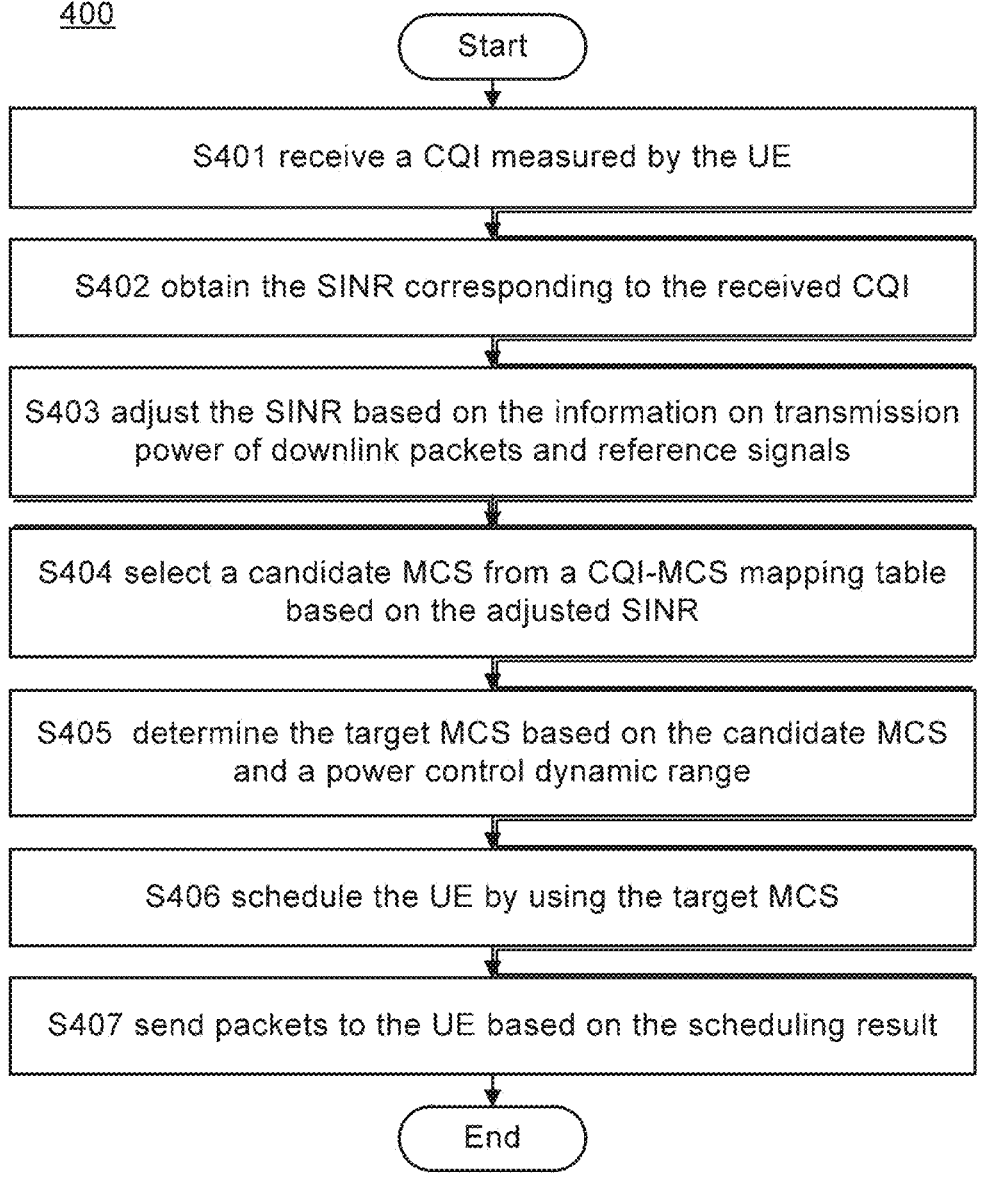
FIG. 4 illustrates a flow chart of a method for scheduling a UE according to further embodiments of the invention.

Reference is now made to FIG. 4, which illustrates a flow chart of a method 400 for scheduling a UE according to embodiments of the invention. In these embodiments, a BS may serve the UE and may employ a non-normal subframe to coordinate inter-cell interference, wherein the transmission power in the non-normal subframe is lower than that in a normal subframe. The method as illustrated in FIG. 4 may be performed at the BS or some other suitable devices.

According to embodiments of the present invention, the method according to the present invention may be implemented in the system illustrated in FIG. 1. Specifically, the method according to embodiments illustrated by FIG. 4 may be performed at the BS, e.g., the Macro eNB 130. Differently, the method according to embodiments illustrated by FIG. 5 may be performed at the UE, e.g., the UE 131, which will be discussed later.

At step S401, a Channel Quality Indicator (CQI) measured by the UE is received.

The LTE provides CQI feedback from a UE to a BS (e.g., an eNodeB) in order to adapt the downlink modulation and code rate to the prevailing channel conditions. In an aspect, the periodicity of CQI reporting may be governed by the eNodeB. In another aspect, two CQI modes may be configured by an upper protocol layer: a periodic CQI mode and an aperiodic CQI mode. For the periodic CQI mode, the CQI reports may be transmitted by the UE on Physical Uplink Control Channel (PUCCH) or on Physical Uplink Shared Channel (PUSCH) if there is a scheduled PUSCH transmission. In one example, the periodicity for wideband periodic CQI reporting may range from 2 ms to 160 ms. For the aperiodic CQI mode, the CQI reports may be transmitted by the UE on PUSCH with or without data. For example, aperiodic CQI reports may be scheduled by an eNodeB via a CQI request bit transmitted on PDCCH. In view of the above, there may be several ways to receive a Channel Quality Indicator (CQI) measured by the UE, which may be optimally used by those skilled in the art in implementing the present invention.

According to embodiments of the present invention, UE may measure CQI based on downlink cell specific reference signals (CRS) for Transmission Modes 1-8 (see 3GPP TS 36.213). For Transmission Mode 9 (see 3GPP TS 36.213), if PMI/RI report is disabled, UE may measure the CQI based on the CRS, otherwise UE may measure the CQI based on channel state information (CSI-RS) shown in FIG. 4. According to embodiments of the present invention, it may be followed by the UE reporting the measured CQI to the BS through PUCCH (periodic report) or PUSCH (aperiodic report).

At step S402, the SINR corresponding to the received CQI is obtained.

In the CQI measurement at the UE, the reception quality of downlink reference signals may be represented as one of several tens of levels of reception SINR (Signal to Interference Noise Ratio), for example, and the CQI may be derived by determining the quantization level of the reception SINR. Therefore, there may be a correspondence between CQI and SINR. Accordingly, in the case that the CQI is measured at the UE and is received at the BS, the corresponding SINR may be obtained in accordance with the correspondence between the CQI and the SINR.

At step S403, the SINR is adjusted based on the information on transmission power of downlink packets and reference signals.

According to embodiments of the present invention, the information on transmission power of downlink packets and reference signals may comprise the ratio of PDSCH EPRE to RS EPRE among PDSCH resource elements (RE), which may reflect variation of the transmission power in a non-normal subframe.

According to embodiments of the present invention, the SINR may be adjusted based on the ratio of PDSCH EPRE to RS EPRE in view of the SINR obtained at step S402. For example, the adjusted SINR (denoted as $SINR_{adj}$) may be obtained by $$SINR_{adj} = SINR_{meas} - \delta \quad (1)$$

where $SINR_{meas}$ represents the SINR obtained at step S402; and $\delta$ represents the ratio of PDSCH EPRE to RS EPRE.

As may be appreciated by those skilled in the art, the adjusted SINR may be obtained by several other ways. For example, the adjusted SINR may be obtained by decreasing the SINR obtained based on the measured CQI by a weighted ratio of PDSCH EPRE to RS EPRE. For another example, the adjusted SINR may be obtained by calculating a proper factor based on the ratio of PDSCH EPRE to RS EPRE and applying this factor to the SINR obtained based on the measured CQI. Those skilled in the art will understand that the above examples are only for illustration rather than limitation.

At step S404, a candidate MCS is selected from a CQI-MCS mapping table based on the adjusted SINR.

3GPP TS36.213, Section 7.2.3 provides a 4-bit CQI table for describing the relation between the CQI index and the modulation and coding schemes. Generally, the MCS index may be represent by the CQI index. The following Table 1 illustratively shows the table, which may be exemplarily used as a CQI-MCS mapping table.

TABLE 1

4-bit CQI Table

| CQI index | modulation | code rate × 1024 | efficiency |
|---|---|---|---|
| 0 | | out of range | |
| 1 | QPSK | 78 | 0.1523 |

TABLE 1-continued 4-bit CQI Table

| CQI index | modulation | code rate × 1024 | efficiency |
|---|---|---|---|
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

According to embodiments of the present invention, a corresponding CQI may be determined based on the adjusted SINR and the correspondence between CQI and SINR. As such, an adjusted CQI may be obtained. In accordance with the index of the adjusted CQI, it may be determined the corresponding MCS (that is, the candidate MCS) from the CQI-MCS mapping table, such as Table 1.

For example, assuming the measured CQI which is received at step S401 has an index of 7, the corresponding MCS employs the modulation mode "16QAM" according to Table 1. After the adjustment of the SINR at steps S402-S403, the adjusted CQI index may have an index of 6. As can be seen from Table 1, after the adjustment, the corresponding MCS no longer employ 16QAM, but QPSK. At this time the candidate MCS is the MCS corresponding to CQI index 6.

At step S405, the target MCS is determined based on the candidate MCS and a power control dynamic range.

The target MCS may be determined in several ways. According to embodiments of the present invention, the candidate MCS may be determined as the target MCS directly without performing any further process.

Figure 6:
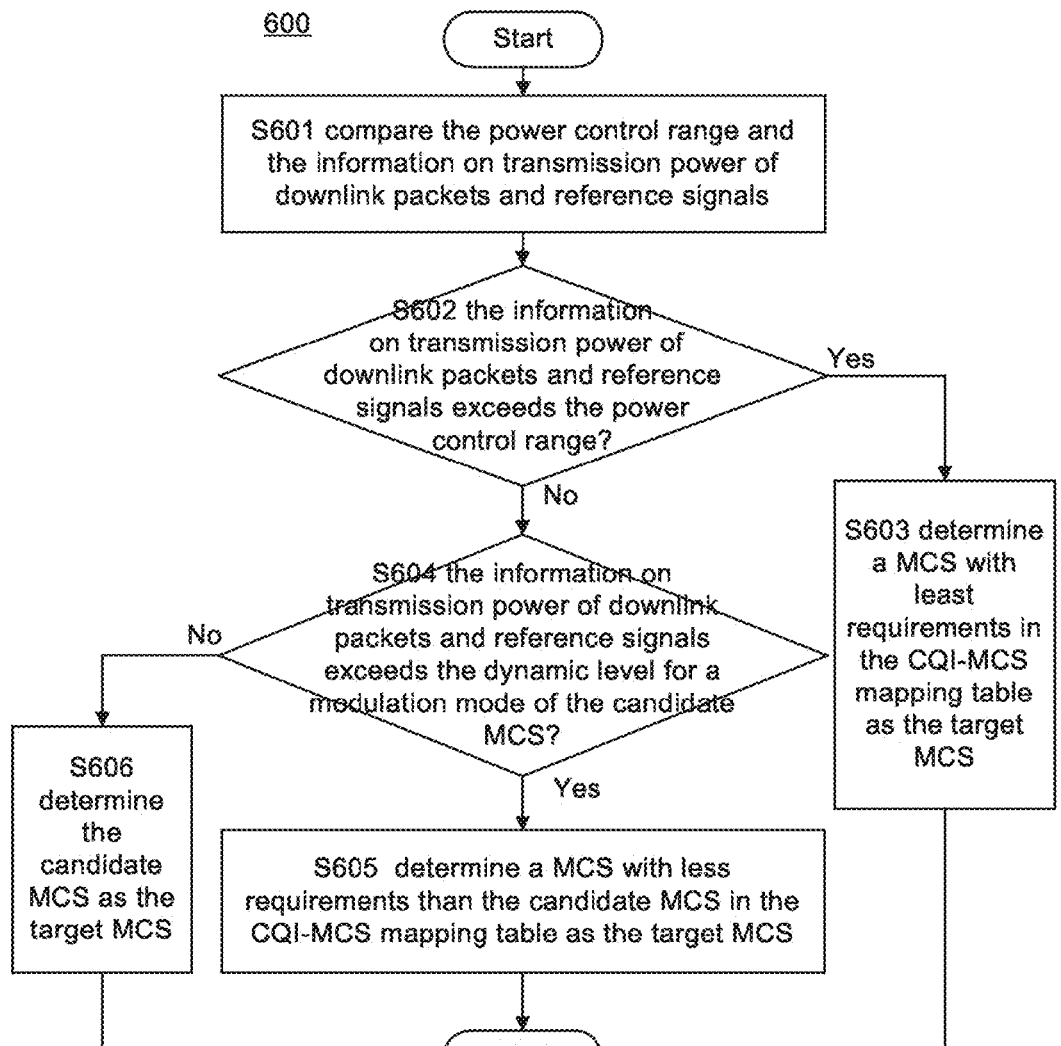
FIG. 6 illustrates a flow chart of a method for determining a target MCS according to embodiments of the invention.

According to further embodiments of the present invention, for better precision, the power control dynamic range may be taken into account in determination of the target MCS. Reference is now made to FIG. 6, which illustrates a flow chart of a method 600 for determining a target MCS according to embodiments of the invention.

The power control dynamic range may comprise at least one dynamic level for at least one modulation mode. For example, the power control dynamic range may comprise several dynamic levels for several modulation modes. The modulation modes may be QPSK, 16QAM, 64QAM, and so on. Accordingly, there may be defined in the power control dynamic range corresponding dynamic levels for respective modulation modes. An example of the power control dynamic range is illustrated in Table 2, which has been defined as Table 6.3.1.1-1, 3GPP TS 36.104. In Table 2, the dynamic level for QPSK may be from −6 dB to +3 dB (denoted as level [−6, +3]), the dynamic level for 16QAM may be from −3 dB to +3 dB, (denoted as level [−3, +3]), the dynamic level for 64QAM may be from 0 dB to 0 dB, (denoted as level [0, 0]), etc. The power control range is [−6, +4] dB.

TABLE 2

Example of the power control dynamic range

| Modulation scheme used on Resource Element (RE) | RE power control dynamic range (dB) | |
|---|---|---|
| | (down) | (up) |
| QPSK (PDCCH) | −6 | +4 |
| QPSK (PDSCH) | −6 | +3 |
| 16QAM (PDSCH) | −3 | +3 |
| 64QAM (PDSCH) | 0 | 0 |

At step S601, the power control range and the information on transmission power of downlink packets and reference signals are compared.

As mentioned above, the information on transmission power of downlink packets and reference signals may comprise the ratio of PDSCH EPRE to RS EPRE. The ratio of PDSCH EPRE to RS EPRE may be configured at the BS in advance, preset by the operator, calculated in accordance with the channel conditions, or obtained in some other suitable means.

According to embodiments of the present invention, the ratio of PDSCH EPRE to RS EPRE may be a value indicating the power variation for a PDSCH resource element (RE) and a reference signal RE in the non-normal subframe, for example δ dB. By comparing the ratio of PDSCH EPRE to RS EPRE with the power control range as illustrated in Table 2, it may be determined that the ratio of PDSCH EPRE to RS EPRE belongs to which dynamic level in the power control dynamic range.

It is to be noted that since the transmission power in the non-normal subframe is lower than that in a normal subframe, the value of the ratio of PDSCH EPRE to RS EPRE may be taken as a negative value in comparing with the power control range. For example, a value of −δ dB may be compared with respective dynamic levels of the power control range.

At step S602, it is judged that whether the information on transmission power of downlink packets and reference signals exceeds the power control range.

According to embodiments of the present invention, if the information on transmission power of downlink packets and reference signals exceeds the power control range, the flow goes to step S603 and determines a MCS with least requirements in the CQI-MCS mapping table as the target MCS. If the information on transmission power of downlink packets and reference signals does not exceed the power control range, the flow goes to step S604 to judge whether the information on transmission power of downlink packets and reference signals exceeds the dynamic level for a modulation mode of the candidate MCS.

In this disclosure, a MCS with the least requirements in the CQI-MCS mapping table may be a MCS which is applicable for the lowest channel quality, a MCS which is applicable for the worst channel conditions, or a MCS which has lowest code rate or efficiency. For example, in the CQI-MCS mapping table such as Table 1, the MCS with the least requirements may be indicated by CQI index 1, which has a modulation mode of QPSK, a code rate of 78 and an efficiency of 0.1523.

According to embodiments of the present invention, if the information on transmission power of downlink packets and reference signals exceeds the dynamic level for a modulation mode of the candidate MCS, the flow goes to step S605 and determines a MCS with less requirements than the candidate MCS in the CQI-MCS mapping table as the target MCS, wherein the target MCS has different modulation mode from the candidate MCS; and if not, the flow goes to step S606 to determine the candidate MCS as the target MCS.

In this disclosure, a MCS with less requirements than the candidate MCS in the CQI-MCS mapping table may be a MCS which is more suitable for a lower channel quality, worse channel conditions or lower code rate or efficiency than the candidate MCS. Take Table 1 for example, if the candidate MCS has the CQI index 7, the MCS with CQI index 6 is a MCS with less requirements than the candidate MCS, because the MCS with CQI index 6 has lower code rate and efficiency than the MCS with CQI index 7 while has different modulation mode "QPSK" from 16QAM in the MCS with CQI index 7.

Table 3 shows embodiments of determination of the target MCS based on Table 1 and Table 2 according to embodiments of the present invention. Specifically, Table 3 shows three cases for determining the target MCS based on the ratio of PDSCH EPRE to RS EPRE and the power control dynamic range.

TABLE 3

Target MCS Determination

| Case | ratio of PDSCH EPRE to RS EPRE | Modulation Mode of Candidate MCS | | |
|---|---|---|---|---|
| | | QPSK | 16QAM | 64QAM |
| 1 | $-\delta \in [-\infty, -6)$ | Lowest MCS in Table 1 | Lowest MCS in Table 1 | Lowest MCS in Table 1 |
| 2 | $-\delta \in [-6, -3)$ | candidate MCS | Highest MCS with QPSK in Table 1 | Highest MCS with QPSK in Table 1 |
| 3 | $-\delta \in [-3, 0)$ | candidate MCS | candidate MCS | Highest MCS with 16QAM in Table 1 |

In Case 1, wherein $-\delta \in [-\infty, -6]$, it can be seen that the ratio of PDSCH EPRE to RS EPRE exceeds the power control range (i.e., [−6, +4]). If the Modulation Mode of the candidate MCS is QPSK, the lowest MCS in Table 1 may be selected as the target MCS; if the Modulation Mode of the candidate MCS is 16QAM, the lowest MCS in Table 1 may be selected as the target MCS; and if the Modulation Mode of the candidate MCS is 64QAM, the lowest MCS in Table 1 may be selected as the target MCS. In the embodiment, the lowest MCS in Table 1 is a MCS with the least requirements, that is, the MCS indicated by CQI index 1, which has a modulation mode of QPSK, a code rate of 78 and an efficiency of 0.1523.

In Case 2, wherein $-\delta \in [-6, -3]$, it can be seen that the ratio of PDSCH EPRE to RS EPRE does not exceed the power control range (i.e., [−6, +3]). As such, the ratio of PDSCH EPRE to RS EPRE may be compared with the dynamic level for a modulation mode of the candidate MCS.

Specifically, if the Modulation Mode of the candidate MCS is QPSK, since the ratio of PDSCH EPRE to RS EPRE falls into the range of [−6,−3] which does not exceed the dynamic level for QPSK (that is, [−6, +3]), the candidate MCS may be selected as the target MCS.

If the Modulation Mode of the candidate MCS is 16QAM, since the ratio of PDSCH EPRE to RS EPRE falls into the range of [−6,−3] which exceeds the dynamic level for 16QAM (that is, [−3, +3]), a MCS with less requirements than the candidate MCS in the CQI-MCS mapping table and having different modulation mode from 16QAM may be determined as the target MCS. As QPSK has less requirements than 16QAM, meanwhile the range of [−6,−3] does not exceed the power control range, so the MCS corresponding to CQI index of 1, 2, 3, 4, 5 or 6 may be selected as the target MCS. In an embodiment of the present invention, the highest MCS with QPSK in Table 1 (i.e., the MCS corresponding to CQI index 6) may be selected as the target MCS.

If the Modulation Mode of the candidate MCS is 64QAM, since the ratio of PDSCH EPRE to RS EPRE falls into the range of [−6,−3] which exceeds the dynamic level for 64QAM (that is, [0, 0]), a MCS with less requirements than the candidate MCS in the CQI-MCS mapping table and having different modulation mode from 64QAM may be determined as the target MCS. Although the modulation mode of 16QAM has less requirements than 64QAM, since [−6,−3] also exceeds the dynamic level for 16QAM (that is, [−3, +3]), the MCS with 16QAM is not suitable. As QPSK has less requirements than both of 64QAM and 16QAM, meanwhile the range of [−6,−3] does not exceed the power control range, so the MCS corresponding to CQI index of 1, 2, 3, 4, 5 or 6 may be selected as the target MCS. In an embodiment of the present invention, the highest MCS with QPSK in Table 1 (i.e., the MCS corresponding to CQI index 6) may be selected as the target MCS.

In Case 3, wherein $-\delta \in [-3, 0]$, it can be seen that the ratio of PDSCH EPRE to RS EPRE does not exceed the power control range (i.e., [−6, +3]). As such, the ratio of PDSCH EPRE to RS EPRE may be compared with the dynamic level for a modulation mode of the candidate MCS.

Specifically, if the Modulation Mode of the candidate MCS is QPSK, since the ratio of PDSCH EPRE to RS EPRE falls into the range of [−3, 0] which does not exceed the dynamic level for QPSK (that is, [−6, +3]), the candidate MCS may be selected as the target MCS.

If the Modulation Mode of the candidate MCS is 16AQM, since the ratio of PDSCH EPRE to RS EPRE falls into the range of [−3, 0] which does not exceed the dynamic level for QPSK (that is, [−3, +3]), the candidate MCS may be selected as the target MCS.

If the Modulation Mode of the candidate MCS is 64QAM, since the ratio of PDSCH EPRE to RS EPRE falls into the range of [−3, 0] which exceeds the dynamic level for 64QAM (that is, [0, 0]), a MCS with less requirements than the candidate MCS in the CQI-MCS mapping table and having different modulation mode from 64QAM may be determined as the target MCS. Since the 16QAM has less requirements than 64QAM and the range of [−3, 0] does not exceed the dynamic level for 16QAM (that is, [−3, +3]), the MCS with 16QAM is suitable for this scenario. In particular, the MCS corresponding to CQI index of 7, 8 or 9 may be selected as the target MCS. In an embodiment of the present invention, the highest MCS with 16QAM in Table 1 (i.e., the MCS corresponding to CQI index 9) may be selected as the target MCS.

It is to be noted that, the above examples described with Case 1, Case 2 and Case 3 are illustrated for purpose of example, rather than limitation. Those skilled in the art may determine the target MCS based on the candidate MCS and a power control range according to some other suitable policies.

At step S406, the UE is scheduled by using the target MCS.

The BS may allocates resource blocks (RBs) to the UE based on the target MCS. Once the target MCS is determined, the scheduling may be implemented in existing ways, so the details are omitted here.

At step S407, packets to the UE are sent based on the scheduling result.

In a non-normal subframe, such as a non-zero power ABS in LTE-A, the BS may send packets to the UE based on the scheduling result under the target MCS, so that the performance gain of eICIC scheme may be improved.

According to other embodiments of the present invention, the method according to the present invention may further comprise a step of transmitting, to the UE, the information on transmission power of downlink packets and reference signals, so that the UE may decode packets transmitted from the BS based on the information on transmission power of downlink packets and reference signals.

Figure 5:
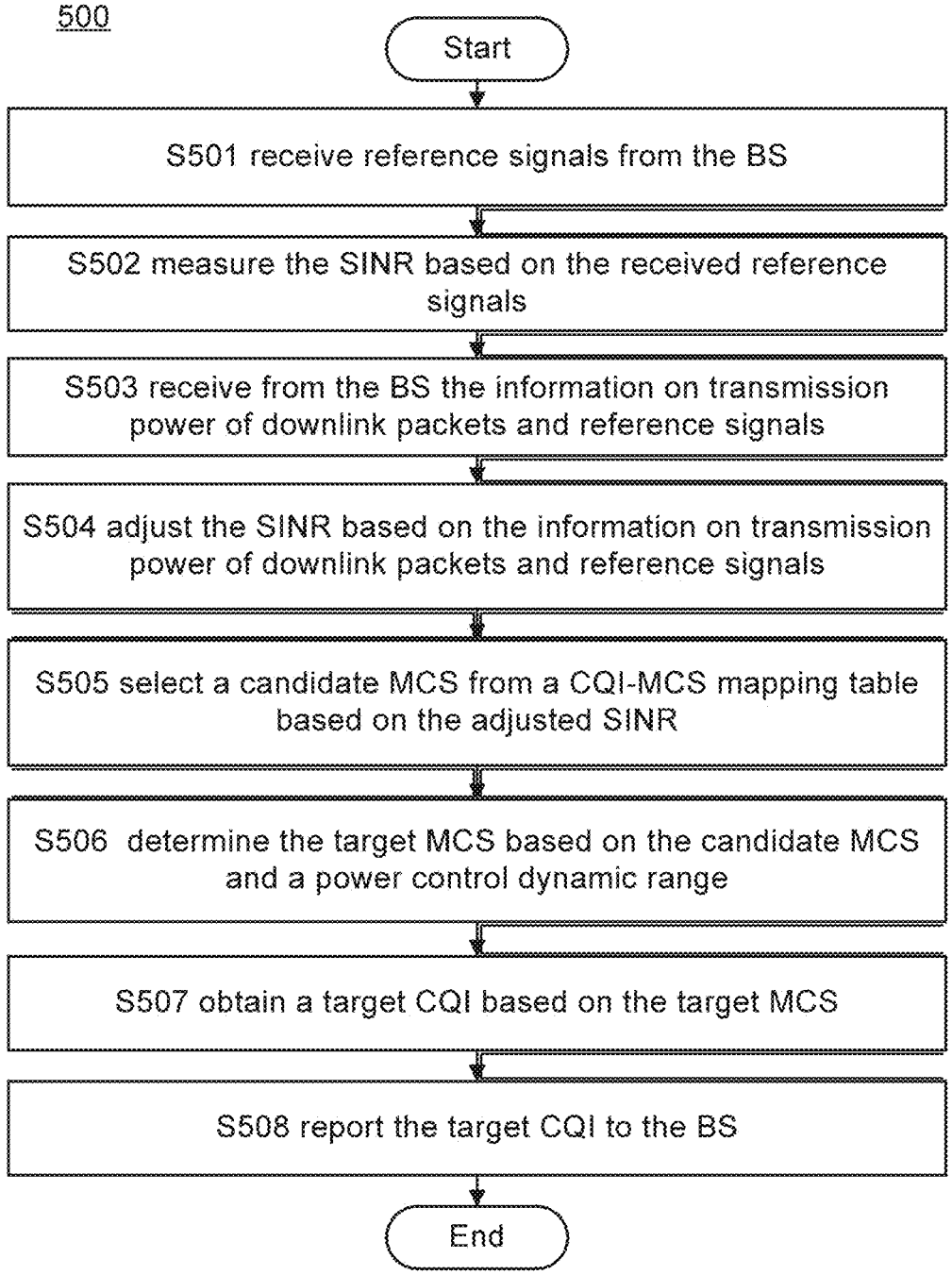
FIG. 5 illustrates a flow chart of a method for scheduling a UE according to further embodiments of the invention.

Reference is now made to FIG. 5, which illustrates a flow chart of a method 500 for scheduling a UE according to embodiments of the invention. In these embodiments, a BS may serve the UE and may employ a non-normal subframe to coordinate inter-cell interference, wherein the transmission power in the non-normal subframe is lower than that in a normal subframe. The method as illustrated in FIG. 5 may be performed at the UE or some other suitable devices.

As mentioned above, according to embodiments of the present invention, the method according to the present invention may be implemented in the system illustrated in FIG. 1. Further, the method according to embodiments as illustrated by FIG. 5 may be performed at the UE, e.g., the UE 131, which is different from the embodiments performed at the BS, as illustrated by FIG. 4.

At step S501, reference signals are received from the BS.

At step S502, the SINR is measured based on the received reference signals.

At step S503, the information on transmission power of downlink packets and reference signals are received from the BS.

According to other embodiments of the present invention, the information on transmission power of downlink packets and reference signals may be transmitted from the BS to the UE, so that the UE may adjust the channel quality information for the non-normal subframe based on the information on transmission power of downlink packets and reference signals, as well as determine a target MCS based on the adjusted channel quality information.

According to other embodiments of the present invention, the information on transmission power of downlink packets and reference signals may comprise a ratio of PDSCH EPRE to RS EPRE, which is also called as PDSCH-to-RS EPRE ratio in the disclosure.

At step S504, the SINR is adjusted based on the information on transmission power of downlink packets and reference signals.

This step is similar to step S403, and all details discussed in step S403 are applicable to step S504.

At step S505, a candidate MCS is selected from a CQI-MCS mapping table based on the adjusted SINR.

This step is similar to step S404, and all details discussed in step S404 are applicable to step S505.

At step S506, the target MCS is determined based on the candidate MCS and a power control dynamic range.

This step is similar to step S405, and all details discussed in step S405 are applicable to step S506.

At step S507, a target CQI is obtained based on the target MCS.

At step S508, the target CQI is reported to the BS.

Since the target CQI is obtained with respect to the non-normal subframe, the target CQI is more suitable for the BS transmitting packets to the UE in a non-normal subframe. Thus, the performance gain of eICIC scheme may be improved.

In the disclosure, the basic idea of embodiments according to FIG. 4 is similar as those according to FIG. 5. According to some embodiments, when the BS sends the ratio of PDSCH EPRE to RS EPRE in all transmission modes, so the UE may have this information to modify its measured CQI based on the ratio of PDSCH EPRE to RS EPRE and a power control dynamic range. According to other embodiments of the present invention, the BS may operate the same way in a non-zero ABS as in a normal subframe.

According to other embodiments of the present invention, when the BS sends the ratio to UE for Transmission Modes 1-6, the UE could modify the measured CQI for such transmission modes according to the embodiments as illustrated with respect to FIG. 5. For Transmission Modes 7-9, if the BS does not send the ratio, BS could modify the UE reported CQI according to the embodiments as illustrated with respect to FIG. 4.

According to other embodiments of the present invention, the method according to the present invention may be extended to Multi-User Multiple Input Multiple Output (MU-MIMO), beamforming and Open Loop Link Adaption (OLLA) operations directly.

Figure 7:
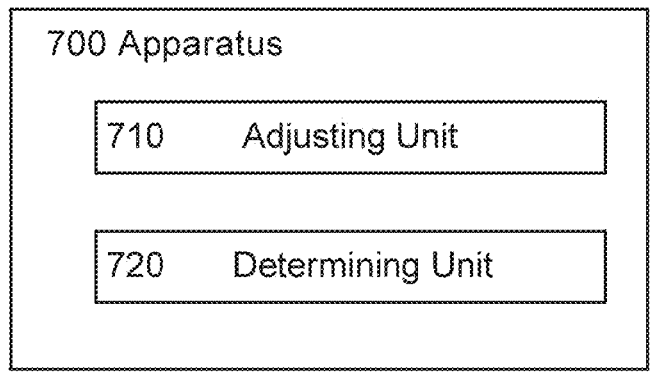
FIG. 7 illustrates a block diagram of an apparatus for scheduling a UE according to embodiments of the invention.

Reference is now made to FIG. 7, which illustrates a block diagram of an apparatus for scheduling a UE according to embodiments of the invention. In these embodiments, a BS may serve the UE and may employ a non-normal subframe to coordinate inter-cell interference, wherein the transmission power in the non-normal subframe is lower than that in a normal subframe. The apparatus as illustrated in FIG. 7 may be implemented at either the BS or the UE, or some other suitable devices.

According to embodiments of the present invention, the apparatus 700 may comprise: an adjusting unit 710 configured to adjust channel quality information for the non-normal subframe based on information on transmission power of downlink packets and reference signals; and a determining unit 720 configured to determine a target modulation and coding scheme (MCS) according to the adjusted channel quality information, so that the BS schedules the UE based on the target MCS in the non-normal subframe.

According to embodiments of the present invention, the adjusting unit 710 may comprise: obtaining means configured to obtain a signal to interference plus noise ratio (SINR) for transmission from the BS to the UE; and adjusting means configured to adjust the SINR based on the information on transmission power of downlink packets and reference signals.

According to embodiments of the present invention, the obtaining means may comprise: means configured to receive a Channel Quality Indicator (CQI) measured by the UE; and means configured to obtain the SINR corresponding to the received CQI.

According to embodiments of the present invention, the obtaining means may comprise: means configured to receive reference signals from the BS; and means configured to measure the SINR based on the received reference signals.

According to embodiments of the present invention, the determining unit 720 may comprise: selecting means configured to select a candidate MCS from a CQI-MCS mapping table based on the adjusted channel quality information; and determining means configured to determine the target MCS based on the candidate MCS and a power control dynamic range, wherein the power control dynamic range comprises at least one dynamic level for at least one modulation mode.

According to embodiments of the present invention, the determining means may comprise: means configured to compare the power control range and the information on transmission power of downlink packets and reference signals; means configured to, in response to that the information on transmission power of downlink packets and reference signals exceeds the power control range, determine a MCS with least requirements in the CQI-MCS mapping table as the target MCS; and in response to that the information on transmission power of downlink packets and reference signals does not exceed the power control range, if the information on transmission power of downlink packets and reference signals does not exceed the dynamic level for a modulation mode of the candidate MCS, determine the candidate MCS as the target MCS, and if the information on transmission power of downlink packets and reference signals exceeds the dynamic level for a modulation mode of the candidate MCS, determine a MCS with less requirements than the candidate MCS in the CQI-MCS mapping table as the target MCS, wherein the target MCS has different modulation mode from the candidate MCS.

According to embodiments of the present invention, the apparatus 700 may further comprise: scheduling unit configured to schedule the UE by using the target MCS; and sending unit configured to send packets to the UE based on the scheduling result.

According to embodiments of the present invention, the apparatus 700 may further comprise: transmitting unit configured to transmit, to the UE, the information on transmission power of downlink packets and reference signals, so that the UE decodes packets transmitted from the BS based on the information on transmission power of downlink packets and reference signals.

According to embodiments of the present invention, the apparatus 700 may further comprise: obtaining unit configured to obtain a target CQI based on the target MCS; reporting unit configured to report the target CQI to the BS, so that the BS obtains the target MCS based on the target CQI, schedules the UE by using the target MCS, and sends packets to the UE based on the scheduling result.

According to embodiments of the present invention, the apparatus 700 may further comprise: receiving unit configured to receive from the BS the information on transmission power of downlink packets and reference signals.

According to embodiments of the present invention, the information on transmission power of downlink packets and reference signals may comprise ratio of Physical Downlink Shared Channel (PDSCH) energy per resource element (EPRE) to reference signal (RS) EPRE.

It is noted that the apparatus 700 may be configured to implement functionalities as described with reference to FIGS. 3-5. Therefore, the features discussed with respect to any of methods 300, 400 and 500 may apply to the corresponding components of the apparatus 700. It is further noted that the components of the apparatus 700 may be embodied in hardware, software, firmware, and/or any combination thereof. For example, the components of the apparatus 700 may be respectively implemented by a circuit, a processor or any other appropriate selection device. Those skilled in the art will appreciate that the aforesaid examples are only for illustration not limitation.

In some embodiment of the present disclosure, the apparatus 700 comprises at least one processor. The at least one processor suitable for use with embodiments of the present disclosure may include, by way of example, both general and special purpose processors already known or developed in the future. The apparatus 700 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compilable or interpretable programming languages. In accordance with embodiments, the computer executable instructions may be configured, with the at least one processor, to cause the apparatus 700 to at least perform according to any of methods 300, 400 and 500 as discussed above.

In view of the above, those skilled in the art will appreciate that with the methods and/or apparatus according to embodiments of the present invention, the MCS for the non-normal subframe is more accurate and suitable, so the performance gain of eICIC scheme may be improved.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 3-5 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for scheduling a user equipment (UE), wherein a base station (BS) serves the UE and employs a first subframe to coordinate inter-cell interference, the first subframe having transmission power lower than that of a second subframe employed by the BS, the method comprising:
    adjusting channel quality information for the first subframe based on information on transmission power of downlink packets and reference signals; and
    determining a target modulation and coding scheme (MCS) according to the adjusted channel quality information, so that the BS schedules the UE based on the target MCS in the first subframe,
    wherein the determining a target MCS according to the adjusted channel quality information comprises:
    selecting a candidate MCS from a CQI-MCS mapping table based on the adjusted channel quality information; and
    determining the target MCS based on the candidate MCS and a power control dynamic range, wherein the power control dynamic range comprises at least one dynamic level for at least one modulation mode, and
    wherein the determining the target MCS based on the candidate MCS and power control range comprises:
    comparing the power control range and the information on transmission power of downlink packets and reference signals;
    in response to that the information on transmission power of downlink packets and reference signals exceeds the power control range, determining a MCS with least requirements in the CQI-MCS mapping table as the target MCS; and
    in response to that the information on transmission power of downlink packets and reference signals does not exceed the power control range,
    if the information on transmission power of downlink packets and reference signals does not exceed the dynamic level for a modulation mode of the candidate MCS, determining the candidate MCS as the target MCS, and
    if the information on transmission power of downlink packets and reference signals exceeds the dynamic level for a modulation mode of the candidate MCS, determining a MCS with less requirements than the candidate MCS in the CQI-MCS mapping table as the target MCS, wherein the target MCS has different modulation mode from the candidate MCS.

2. The method of claim 1, wherein adjusting channel quality information for first subframe based on information on transmission power of downlink packets and reference signals comprises:
    obtaining a signal to interference plus noise ratio (SINR) for transmission from the BS to the UE; and
    adjusting the SINR based on the information on transmission power of downlink packets and reference signals.

3. The method of claim 2, wherein obtaining a SINR for the transmission from the BS to the UE comprises:
    receiving a Channel Quality Indicator (CQI) measured by the UE; and
    obtaining the SINR corresponding to the received CQI.

4. The method of claim 2, wherein obtaining a SINR for the transmission from the BS to the UE comprises:
    receiving reference signals from the BS; and
    measuring the SINR based on the received reference signals.

5. The method of claim 1, further comprising:
    scheduling the UE by using the target MCS; and
    sending packets to the UE based on the scheduling result.

6. The method of claim 1, further comprising:
    transmitting, to the UE, the information on transmission power of downlink packets and reference signals, so that the UE decodes packets transmitted from the BS based on the information on transmission power of downlink packets and reference signals.

7. The method of claim 1, further comprising:
    obtaining a target CQI based on the target MCS; and
    reporting the target CQI to the BS, so that the BS obtains the target MCS based on the target CQI, schedules the UE by using the target MCS, and sends packets to the UE based on the scheduling result.

8. The method of claim 1, further comprising:
    receiving from the BS the information on transmission power of downlink packets and reference signals.

9. The method of claim 1, wherein the information on transmission power of downlink packets and reference signals comprises ratio of Physical Downlink Shared Channel (PDSCH) energy per resource element (EPRE) to reference signal (RS) EPRE.

10. An apparatus for scheduling a user equipment (UE), wherein a base station (BS) serves the UE and employs a first subframe to coordinate inter-cell interference, the first subframe having transmission power lower than that of a second subframe employed by the BS, the apparatus comprising:
    adjusting unit configured to adjust channel quality information for the first subframe based on information on transmission power of downlink packets and reference signals; and
    determining unit configured to determine a target modulation and coding scheme (MCS) according to the adjusted channel quality information, so that the BS schedules the UE based on the target MCS in the first subframe, wherein the determining unit comprises:

selecting means configured to select a candidate MCS from a CQI-MCS mapping table based on the adjusted channel quality information; and determining means configured to determine the target MCS based on the candidate MCS and a power control dynamic range, wherein the power control dynamic range comprises at least one dynamic level for at least one modulation mode, and wherein the determining means comprises:

means configured to compare the power control range and the information on transmission power of downlink packets and reference signals;

means configured to, in response to that the information on transmission power of downlink packets and reference signals exceeds the power control range, determine a MCS with least requirements in the CQI-MCS mapping table as the target MCS; and in response to that the information on transmission power of downlink packets and reference signals does not exceed the power control range, if the information on transmission power of downlink packets and reference signals does not exceed the dynamic level for a modulation mode of the candidate MCS, determine the candidate MCS as the target MCS, and if the information on transmission power of downlink packets and reference signals exceeds the dynamic level for a modulation mode of the candidate MCS, determine a MCS with less requirements than the candidate MCS in the CQI-MCS mapping table as the target MCS, wherein the target MCS has different modulation mode from the candidate MCS.

11. The apparatus of claim 10, wherein the adjusting unit comprises:

obtaining means configured to obtain a signal to interference plus noise ratio (SINR) for transmission from the BS to the UE; and adjusting means configured to adjust the SINR based on the information on transmission power of downlink packets and reference signals.

12. The apparatus of claim 11, wherein the obtaining means comprises:

means configured to receive a Channel Quality Indicator (CQI) measured by the UE; and means configured to obtain the SINR corresponding to the received CQI.

13. The apparatus of claim 11, wherein the obtaining means comprises:

means configured to receive reference signals from the BS; and means configured to measure the SINR based on the received reference signals.

14. The apparatus of claim 10, further comprising:

scheduling unit configured to schedule the UE by using the target MCS; and sending unit configured to send packets to the UE based on the scheduling result.

15. The apparatus of claim 10, further comprising:

transmitting unit configured to transmit, to the UE, the information on transmission power of downlink packets and reference signals, so that the UE decodes packets transmitted from the BS based on the information on transmission power of downlink packets and reference signals.

16. The apparatus of claim 10, further comprising:

obtaining unit configured to obtain a target CQI based on the target MCS; and reporting unit configured to report the target CQI to the BS, so that the BS obtains the target MCS based on the target CQI, schedules the UE by using the target MCS, and sends packets to the UE based on the scheduling result.

17. The apparatus of claim 10, further comprising:

receiving unit configured to receive from the BS the information on transmission power of downlink packets and reference signals.

18. The apparatus of claim 10, wherein the information on transmission power of downlink packets and reference signals comprises ratio of Physical Downlink Shared Channel (PDSCH) energy per resource element (EPRE) to reference signal (RS) EPRE.

19. An apparatus for scheduling a user equipment (UE), wherein a base station (BS) serves the UE and employs a first subframe to coordinate inter-cell interference, the first subframe having transmission power lower than that of a second subframe employed by the BS, the apparatus comprising:

at least one memory operable to store program code; and at least one processor operable to access said memory and read said program code and operate as instructed by said program code to:

adjust channel quality information for the first subframe based on information on transmission power of downlink packets and reference signals; and determine a target modulation and coding scheme (MCS) according to the adjusted channel quality information, so that the BS schedules the UE based on the target MCS in the first subframe, wherein the determining a target MCS according to the adjusted channel quality information comprises:

selecting a candidate MCS from a CQI-MCS mapping table based on the adjusted channel quality information; and determining the target MCS based on the candidate MCS and a power control dynamic range, wherein the power control dynamic range comprises at least one dynamic level for at least one modulation mode and wherein the determining the target MCS based on the candidate MCS and a power control range comprises:

comparing the power control range and the information on transmission power of downlink packets and reference signals;

in response to that the information on transmission power of downlink packets and reference signals exceeds the power control range, determining a MCS with least requirements in the CQI-MCS mapping table as the target MCS;

in response to that the information on transmission power of downlink packets and reference signals does not exceed the power control range, if the information on transmission power of downlink packets and reference signals does not exceed the dynamic level for a modulation mode of the candidate MCS, determining the candidate MCS as the target MCS, and if the information on transmission power of downlink packets and reference signals exceeds the dynamic level for a modulation mode of the candidate MCS determining a MCS with less requirements than the candidate MCS in the CQI-MCS mapping table as the target MCS, wherein the target MCS has different modulation mode from the candidate MCS.

* * * * *